J. W. WEEKLY.
NECK YOKE SAFETY HOLDER.
APPLICATION FILED SEPT. 9, 1910.
1,117,117.
Patented Nov. 10, 1914.
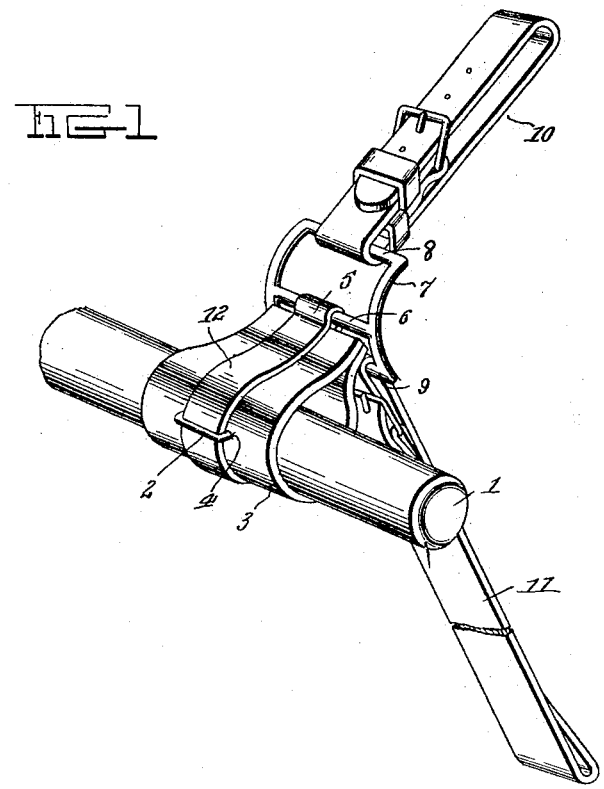
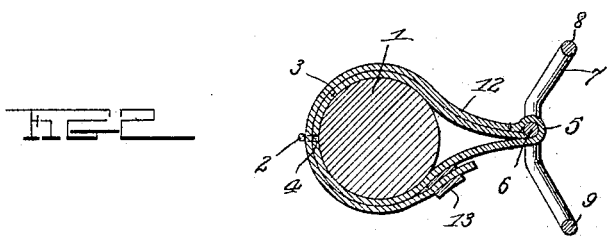
Witnesses
J. C. Crawford
Wm. J. Wooth.
Inventor
James W. Weekly,
By Victor J. Evans
Attorney

UNITED STATES PATENT OFFICE.

JAMES W. WEEKLY, OF FREDERICKTOWN, OHIO.

NECK-YOKE SAFETY-HOLDER.

1,117,117. Specification of Letters Patent. Patented Nov. 10, 1914.

Application filed September 9, 1910. Serial No. 581,185.

*To all whom it may concern:*

Be it known that I, JAMES W. WEEKLY, a citizen of the United States, residing at Fredericktown, in the county of Knox and State of Ohio, have invented new and useful Improvements in Neck-Yoke Safety-Holders, of which the following is a specification.

This invention relates to improvements in safety holders for neck yoke loops or hitches, and the primary object of the invention is to provide a device of this character which may be easily and quickly secured to the neck yoke and which may be readily detached therefrom, the hitch being so constructed that the choke strap and collar strap will remain upon the harness after the hitch has been removed.

A still further object of the invention is to provide a neck yoke with a suitable loop, and a neck hitch constructed of flexible leather or like material having a strap and a loop, the said strap being adapted to engage the loop of the neck yoke as well as the loop of the hitch so as to effectively retain the hitch upon the yoke, and at the same time provide for revoluble movement without the employment of buckles, snaps, or other analogous devices.

The numeral 1 designates the end of a neck-yoke which is provided upon its outer face with a substantially U-shaped hasp 2.

The numeral 3 designates the yoke hitch. This hitch or loop embodies a body portion which is shaped to engage the yoke and the said hitch is provided with an elongated slot through which passes the hasp 2 when the hitch is arranged upon the yoke. The body of the hitch has one of its ends centrally provided with a reduced strap 12, the same being looped, as at 5, and at its juncture with the hitch, over a central bar 6 of a buckle 7. Connected with the upper connecting bar 8 of the buckle 7 is the collar or hame strap loop 10, while connected with the lower bar 9 of the buckle is the end member 11 of the choke strap of the harness. The strap 12 is of a size sufficient to pass through the hasp 2, and the end of the hitch upon which is formed the strap 12 is provided with a loop 13 which is adapted to receive the end of the said strap.

From the above description, it will be noted that the hitch is formed from a single piece of material, and that by providing the same with the reduced strap 12, the hitch may be sustained at a desired distance from the buckle 7, and further, that the body of the hitch may be enlarged or reduced, as circumstances require, so that the said hitch may be readily adjusted to receive the ends of neck yokes of varying sizes.

From the above description, taken in connection with the drawings, the utility as well as the simplicity of the device, will, it is thought be apparent without further detailed description.

Having thus described the invention, what I claim is:

In a neck yoke safety holder device in which the neck yoke carries a staple, a neck yoke hitch made of flexible material, said hitch consisting of a relatively wide strap shaped into a loop and having its opposing ends secured together, said hitch being formed with a transversely disposed slit through which is adapted to project said staple, a metal buckle, a transverse intermediate rung formed upon said buckle, an elongated relatively narrow extension strap formed substantially centrally upon said hitch, said extension strap at its point of juncture with said hitch being passed around said rung and being secured to said hitch to hold it against displacement therefrom at its inner end, said extension strap being of a width to pass through said staple, and a sustaining loop carried by said hitch at its opposite side with respect to the point of securement of said extension strap to said hitch, said extension strap having its free end engaging said sustaining loop whereby this end is secured against displacement.

In testimony whereof I affix my signature in presence of two witnesses.

JAMES W. WEEKLY.

Witnesses:
W. P. TINNELL,
W. B. BURT.

Copies of this patent may be obtained for five cents each, by addressing the "Commissioner of Patents, Washington, D. C."